United States Patent
Lewis

(10) Patent No.: US 11,028,927 B2
(45) Date of Patent: Jun. 8, 2021

(54) WIDE DIFFERENTIAL PRESSURE RANGE AIR RIDING CARBON SEAL

(71) Applicant: Rolls-Royce Corporation, Indianapolis, IN (US)

(72) Inventor: Nathan A. Lewis, Zionsville, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 100 days.

(21) Appl. No.: 16/265,484

(22) Filed: Feb. 1, 2019

(65) Prior Publication Data

US 2019/0162311 A1 May 30, 2019

Related U.S. Application Data

(63) Continuation of application No. 14/990,252, filed on Jan. 7, 2016, now Pat. No. 10,234,036.

(Continued)

(51) Int. Cl.
*F16J 15/44* (2006.01)
*F16J 15/36* (2006.01)
(Continued)

(52) U.S. Cl.
CPC .......... *F16J 15/445* (2013.01); *F01D 11/003* (2013.01); *F01D 11/025* (2013.01); *F02C 7/36* (2013.01);
(Continued)

(58) Field of Classification Search
CPC ........ F16J 15/445; F16J 15/36; F16J 15/3452; F16J 15/3448; F16J 15/363; F16J 15/366;
(Continued)

(56) References Cited

U.S. PATENT DOCUMENTS 2,939,730 A * 6/1960 Turpin ................ F16J 15/36
277/370
2,984,505 A * 5/1961 Andresen ............ F16J 15/36
277/388

(Continued)

FOREIGN PATENT DOCUMENTS

EP 2541116 A1 1/2013
WO WO-2014133952 A1 9/2014

OTHER PUBLICATIONS

Extended European Search Report dated Jun. 9, 2016 issued in EP Patent Application No. 16150752.0.
(Continued)

*Primary Examiner* — David Hamaoui
*Assistant Examiner* — Jesse M Prager
(74) *Attorney, Agent, or Firm* — Fishman Stewart PLLC

(57) ABSTRACT

An exemplary carbon seal assembly generally may include a stator fixable to a static component, such as a mechanical housing of a gas turbine engine, and a rotor fixable to a rotating component, such as a shaft of the gas turbine engine, where the rotating component is rotatable relative to the static component. The carbon seal assembly may also include a carbon ring and a spring attached thereto positioned between the stator and the rotor, where the spring may (Continued)

be configured to move the carbon ring fore and aft between the stator and the rotor. The carbon seal assembly may further include a diaphragm operatively attached to stator and to the carbon ring and spring combination.

20 Claims, 5 Drawing Sheets

Related U.S. Application Data

(60) Provisional application No. 62/102,304, filed on Jan. 12, 2015.

(51) Int. Cl.
*F01D 11/02* (2006.01)
*F01D 11/00* (2006.01)
*F16J 15/34* (2006.01)
*F02C 7/36* (2006.01)

(52) U.S. Cl.
CPC ....... *F16J 15/3448* (2013.01); *F16J 15/3452* (2013.01); *F16J 15/36* (2013.01); *F05D 2220/32* (2013.01); *F05D 2230/60* (2013.01); *F05D 2240/55* (2013.01); *F05D 2260/38* (2013.01); *F05D 2300/224* (2013.01)

(58) Field of Classification Search
CPC ........ F01D 11/003; F01D 11/025; F02C 7/36; F05D 2230/32; F05D 2230/60; F05D 2240/55

See application file for complete search history.

(56) References Cited

U.S. PATENT DOCUMENTS

| | | | |
|---|---|---|---|
| 2,984,506 A | 6/1961 | Andresen et al. | |
| 3,311,381 A | 3/1967 | Pech | |
| 4,082,296 A | 4/1978 | Stein | |
| 4,136,887 A | 1/1979 | Wentworth, Jr. | |
| 4,260,166 A | 4/1981 | Frosch et al. | |
| 4,406,459 A | 9/1983 | Davis et al. | |
| 5,143,384 A | 9/1992 | Lipschitz | |
| 5,354,070 A * | 10/1994 | Carmody | F16J 15/3436 277/370 |
| 6,450,762 B1 | 9/2002 | Munshi | |
| 6,578,849 B2 | 6/2003 | Haje | |
| 6,601,854 B2 | 8/2003 | Auber | |
| 6,758,476 B2 | 7/2004 | Takahashi | |
| 6,848,689 B2 | 2/2005 | Auber | |
| 7,862,046 B2 | 1/2011 | Lederer et al. | |
| 2007/0120328 A1 | 5/2007 | Haselbacher et al. | |
| 2013/0147123 A1 | 6/2013 | Davies et al. | |
| 2015/0337674 A1* | 11/2015 | Sonokawa | F16J 15/3472 415/173.3 |

OTHER PUBLICATIONS

European Office Action dated Sep. 12, 2018 issued in EP Patent Application No. 16150752.0.
English Abstract for EP2541116 A1.

* cited by examiner

WIDE DIFFERENTIAL PRESSURE RANGE AIR RIDING CARBON SEAL

CROSS-REFERENCE TO RELATED APPLICATIONS

This application is a continuation claiming priority to U.S. patent application Ser. No. 14/990,252 filed Jan. 7, 2016, which claims priority to U.S. Provisional Patent Application No. 62/102,304 filed Jan. 12, 2015, the contents of which are hereby incorporated in their entirety.

FIELD OF TECHNOLOGY

The present disclosure relates to a wide differential pressure range carbon seal, such as an air riding carbon seal, and a method thereof.

BACKGROUND

Carbon seals generally may be used to seal a fluid leakage path between a static component and a rotating component, for example in a gas turbine engine for sealing oil within a gearbox. Carbon seals may be either contacting or air riding, and generally may include a stator fixed and sealed to the static component, and a rotor fixed and sealed to the rotating component. A carbon ring may be mounted axially between the stator and the rotor with a spring to force the carbon into contact or proximity with the rotor.

In an air riding carbon seal, the rotor may be designed with hydropads, which cause separation of the carbon ring and the rotor with a fluid (air) film. The design of an air riding carbon seal and the hydropads may be dependent on such factors and parameters as rotational speed of the rotating component, force of the spring loading the carbon ring against the rotor, and pressure differential across the seal. If an air riding carbon seal is operated outside its design point (range), it may leak or become, effectively, a contacting face seal. Common air riding carbon seals are generally designed for a specific range of load conditions, i.e., lower pressure differential across the seal, and therefore may not be as effective with load conditions outside of that range.

Therefore, it would be helpful to provide a carbon seal, such as an air riding carbon seal, that may accommodate a wide range of design conditions, such as differences in pressure differential and speed.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary carbon seal assembly generally may include a stator fixable to a static component, and a rotor fixable to a rotating component, where the rotating component is rotatable relative to the static component. The carbon seal assembly may also include a carbon ring and a spring attached thereto positioned between the stator and the rotor, where the spring may be configured to move the carbon ring fore and aft between the stator and the rotor. The carbon seal assembly may further include a diaphragm operatively attached to stator and to the carbon ring and spring combination.

An exemplary gas turbine engine generally may include a mechanical housing and a shaft rotatable relative to the housing. The gas turbine engine may also include a carbon seal assembly having a stator fixed to the housing, and a rotor fixed to the shaft. The carbon seal assembly may also include a carbon ring and a spring attached thereto positioned between the stator and the rotor, where the spring may be configured to move the carbon ring between the stator and the rotor. The carbon seal assembly may further include a diaphragm operatively attached to an unfixed end of the stator and to the carbon ring.

An exemplary method for installing a carbon seal assembly may include first attaching a diaphragm to the stator and to the carbon ring and spring combination to form a static assembly. The method may then include fixing the static assembly to a static component, such as the mechanical housing of the gas turbine engine or gearbox, and fixing a rotor to a rotating component, such as the shaft of the gas turbine engine or other shaft, that is rotatable relative to the static component. The carbon ring and spring combination generally may be positioned between the stator and the rotor such that the carbon ring may move toward and away from the rotor.

Figure 1:
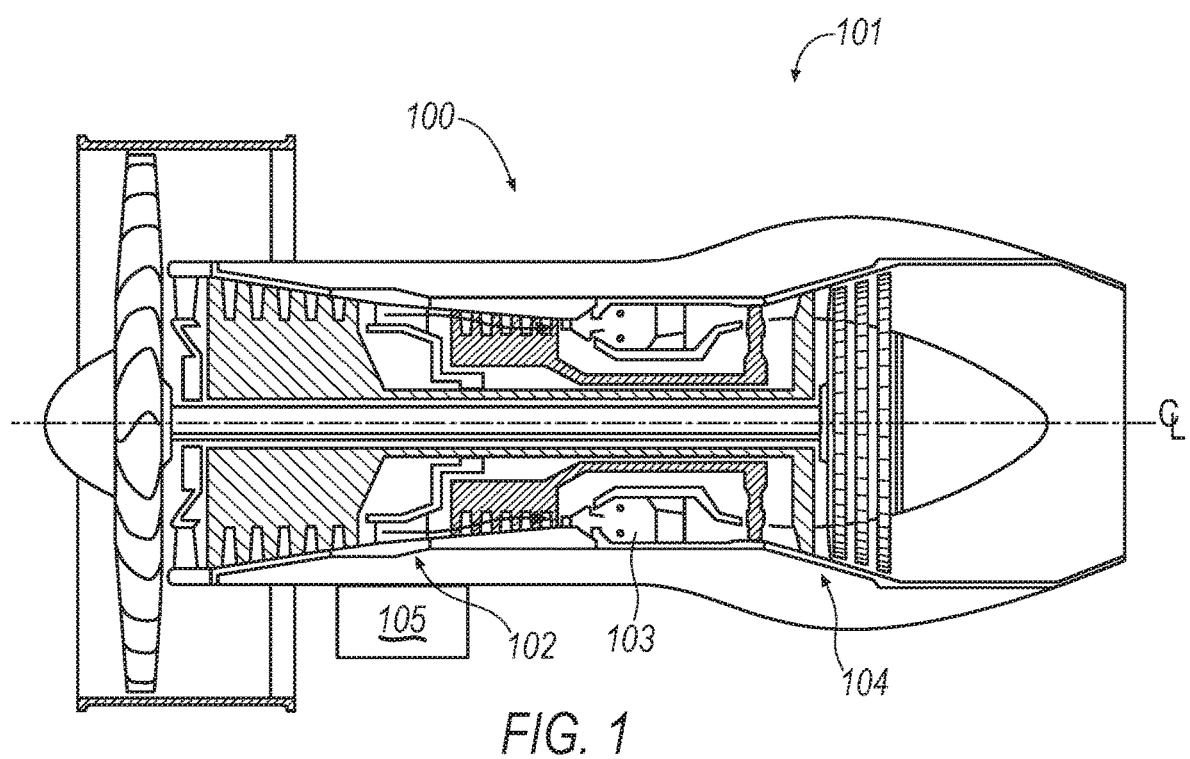
FIG. 1 is a schematic cross-sectional view of an exemplary gas turbine engine employing a carbon seal assembly.

Referring now to the figures, an exemplary gas turbine engine 101 is shown in FIG. 1. The gas turbine engine 101 generally may include a compressor section 102, a combustor section 103, and a turbine section 104. The compressor section 102 and the turbine section 104 may be mounted on a common shaft or spool. While the gas turbine engine 101 is depicted in FIG. 1 as a multi-shaft configuration, it should be appreciated that the gas turbine engine 101 may be a single-shaft configuration as well. In addition, while the gas turbine engine 101 is depicted as a turbofan, it should further be appreciated that it may be, but is not limited to, a turbofan, a turboshaft, or a turboprop. The compressor section 102 may be configured to receive and compress an inlet air stream. The compressed air may then be mixed with a steady stream of fuel and ignited in the combustor section 103. The resulting combustion gas may then enter the turbine section 104 in which the combustion gas causes turbine blades to rotate and generate energy.

Figure 2:
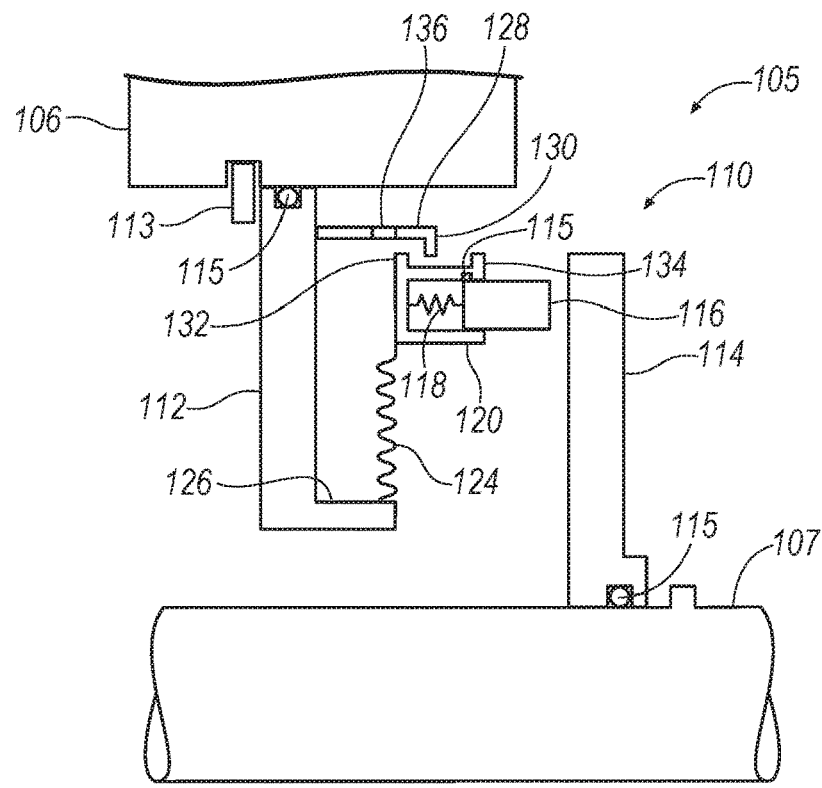
FIGS. 2-7 are schematic views of the carbon seal assembly of FIG. 1 according to different exemplary approaches.
Figure 3:
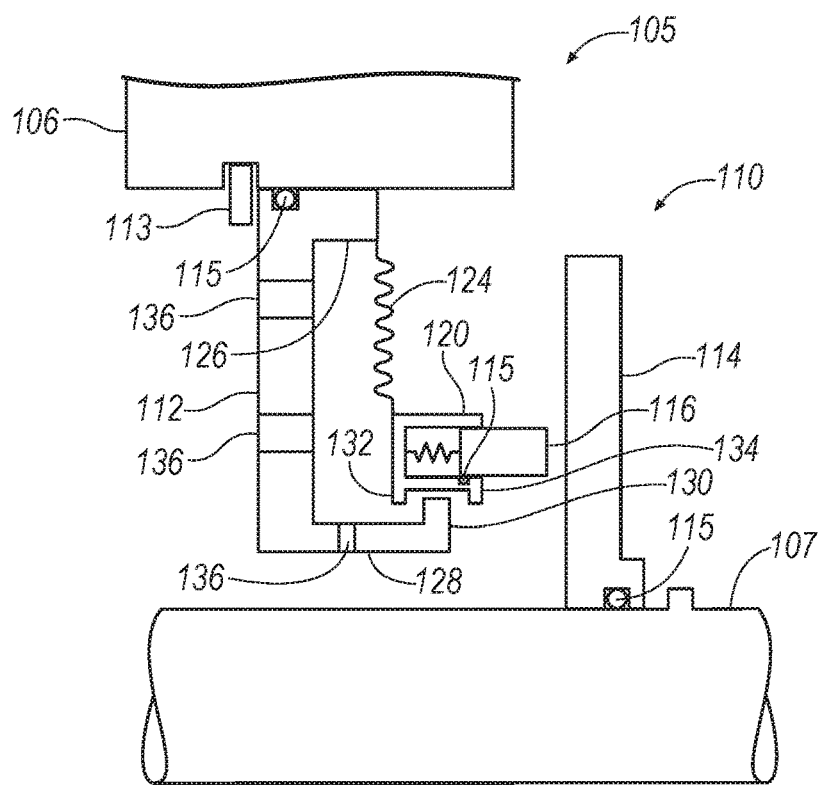
Figure 4:
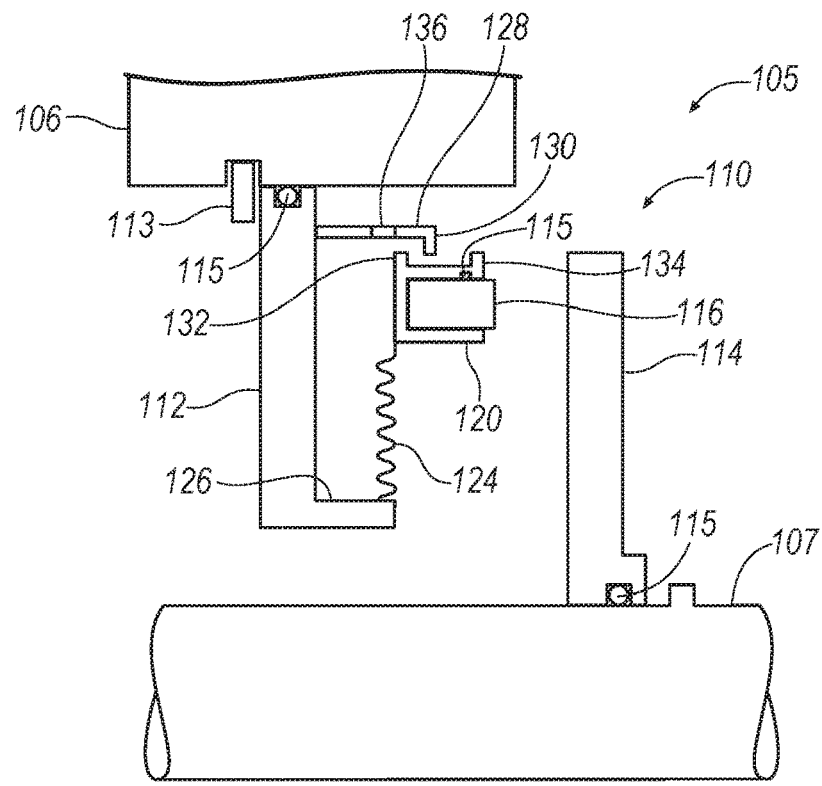

The gas turbine engine 101 may also include a gearbox 105 connected to the common shaft. As seen in FIGS. 2-4 and described in more detail hereinafter, a carbon seal assembly 110 may be implemented in the gearbox 105. While the carbon seal assembly 110 is described hereinafter with respect to the gearbox 105, it should be appreciated that the carbon seal assembly 110 may be applicable to other parts of the gas turbine engine 101 in which it may be desirable to prevent leakage from entering a particular compartment, for example with the mainline shaft of the gas turbine engine 101, an internal gearbox, or a sump, and further, in other applications other than a gas turbine engine, for example reciprocating engines, or any other applicable machinery in marine, aerospace, or industrial applications.

Referring now to FIGS. 2-7, a carbon seal assembly 110 is depicted in the gearbox 105 of the gas turbine engine 101. The gearbox 105 generally may have a mechanical housing 106, or static component, and an accessory shaft 107, or rotating component, rotatable relative to the mechanical housing 106. The carbon seal assembly 110 may be positioned between the housing 106 and the accessory shaft 107, and may be configured to seal the gearbox 105 to prevent leakage of a fluid, such as oil, out of the gearbox 105.

The carbon seal assembly 110 may include a stator 112 fixed and sealed to the mechanical housing 106, and a rotor 114 fixed and sealed to the accessory shaft 107, such that the rotor 114 rotates with the accessory shaft 107 while the stator 112 remains static. The mechanical housing 106 may have a retaining ring 113 disposed therein to position the carbon seal assembly 110 and to retain it axially in place. The carbon seal assembly 110 may also include an O-ring 115 or other sealing mechanism between the stator 112 and the mechanical housing 106, and between the rotor 114 and the accessory shaft 107.

The carbon seal assembly 110 may also include a carbon ring 116 and a spring 118 mounted between the stator 112 and the rotor 114. The carbon ring 116 generally may extend annularly around the accessory shaft 107. The spring 118 may be configured to move the carbon ring 116 fore and aft, i.e., toward and away from the rotor 114. With a contacting carbon seal, the spring 118 may press the carbon ring 116 against the rotor 114 to provide the seal. With an air riding carbon seal, the spring 118 will press the carbon against the rotor and during operation the hydropads (shaped depressions in the rotor) pump air sufficient to create and maintain a small gap between the carbon ring 116 and the rotor 114, while maintaining the seal. The carbon ring 116 and the spring 118 may be at least partially disposed within a casing 120, as seen in FIGS. 2, 3, and 5-7. Alternatively, the spring 118 may be attached to the exterior of the casing 120 and only the carbon ring 116 partially disposed within the casing 120, as seen in FIG. 4. In either approach, there may be at least one O-ring 115 providing a seal between the casing 120 and the carbon ring 116, either at an inner diameter of the carbon ring 116 or an outer diameter of the carbon ring 116.

The carbon seal assembly 110 may further include a diaphragm 124 attached to the stator 112 and to the casing 120. The stator 112 may have a ledge 126 extending axially from an end of the stator 112, and to which the diaphragm 124 may be attached. The diaphragm 124 generally may be made of any flexible material, including but not limited to, elastomers, metals, and the like, that have sufficient strength to withstand the pressures associated with the gearbox 105, while allowing the diaphragm 124 to stretch or extend in order to accommodate varying pressure differentials. Alternatively or in addition, the diaphragm 124 may be configured to allow further expansion, such as with the bellows configuration shown in the figures.

Generally, there is a pressure differential across the carbon seal assembly 110. This pressure differential may have a wide range depending upon different operating conditions of the gas turbine engine 101, for example increases in engine speed and resultant gas turbine engine bleed air into the gearbox system. However, carbon seals that only incorporate the spring and carbon ring without a diaphragm may only be able to accommodate a relatively narrow pressure/speed range condition. As the pressure differential decreases below the design point (range) of the carbon seal, it may leak and/or as the differential pressure increases beyond the design range in the case of an air riding carbon seal, may force the carbon spring against the rotor, thereby turning it into a contacting carbon seal increasing temperature and wear and defeating the purpose of an air riding carbon seal. The diaphragm 124 may act as a variable rate spring to accommodate increasing pressure differentials that fall outside of the design point of the primary spring 118 thus also providing the system with a dual rate spring. As the pressure differential increases, the diaphragm 124 may expand, thereby applying load with increasing pressure as opposed to a simple carbon ring 116 and the spring 118 assembly without a diaphragm. As such, the diaphragm 124 may allow the carbon ring 116 to set itself to seal the rotor 114 at a low pressure design point, requiring a lower rate spring 118, and then mechanically and automatically self-adjust the carbon ring load with increasing pressures inside the gearbox 105.

Figure 5:
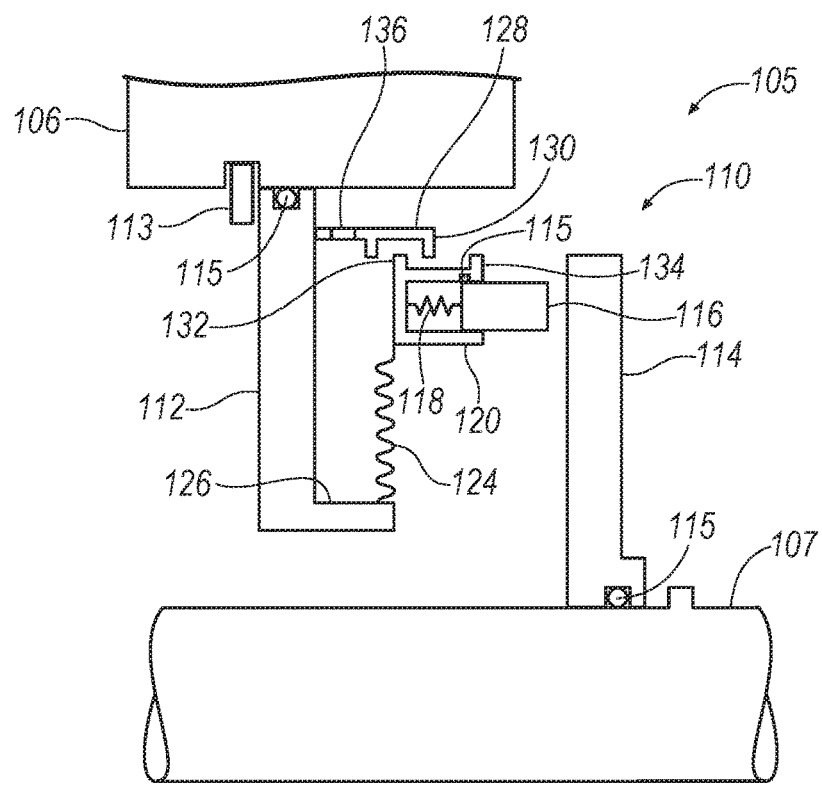

The carbon seal assembly 110 may further include a limit stop 128 to ensure that the minimum spring load on the carbon ring 116 may be maintained while still allowing air through to act on the diaphragm 124 for the higher pressure operating points. The limit stop 128 generally may extend axially from the stator 112 to the rotor 114. The positioning of the limit stop 128 may depend upon which of the internal pressure and the external pressure of the gearbox 105 is greater. As seen in FIGS. 2, 4, and 5, where the internal pressure may be greater, the limit stop 128 may be positioned axially above (i.e., further away from the shaft 106) the casing 120. In such an approach, the limit stop 128 may have a lip 130 extending radially inwardly from an inner surface of the limit stop 128, and the casing 120 may have a fore stop 132 and an aft stop 134 extending radially outwardly from an outer surface of the casing 120, as seen in FIGS. 2 and 4. The lip 130 may be positioned between the fore and aft stops 132 and 134 such that the lip 130 may engage with the stops 132 and 134 to control the limits of the carbon ring 116 movement. Alternatively, as seen in FIG. 5, the lip 130 may extend radially outwardly from the outer surface of the casing 120, and the fore and aft stops 132 and 134 may extend radially inwardly from the inner surface of the limit stop 130. In either approach, there may be a gap between the lip 130, the stops 132 and 134, and the contacting surfaces to enable the high pressure air to flow to the diaphragm 124. In addition or alternatively, the limit stop 128 may be porous, for example, may have at least one vent hole 136, to allow the high pressure air to flow through it to the diaphragm 124.

On the other hand, as seen in FIG. 3, where the external pressure of the gearbox 105 may be greater, the limit stop 128 may be positioned radially below (i.e., closer to the shaft 107) than the casing 120. In such a scenario, the lip 130 may extend radially outwardly from an outer surface of the limit stop 128, and the fore and aft stops 132 and 134 may extend radially inwardly from an outer surface of the casing 120. The lip 130 and the fore and aft stops 132 and 134 may engage with each other in the same manner described above to limit the movement of the carbon ring 116. In addition, the stator 116 and/or the limit stop 130 may include vent holes 136. While only this exemplary approach is shown for the scenario in which the external pressure of the gearbox 105 is greater than the internal pressure, it should be appreciated that any of the variations depicted in FIGS. 4 and 5 may be incorporated. For example, the lip 130 may extend radially inwardly from an outer surface of the casing 120 while the fore and aft stops 132 and 134 may extend radially outwardly from the limit stop 128. As another example, the spring 118 may be located outside of the casing 120, and there may be an O-ring between the casing 120 and the carbon ring 116.

Figure 6:
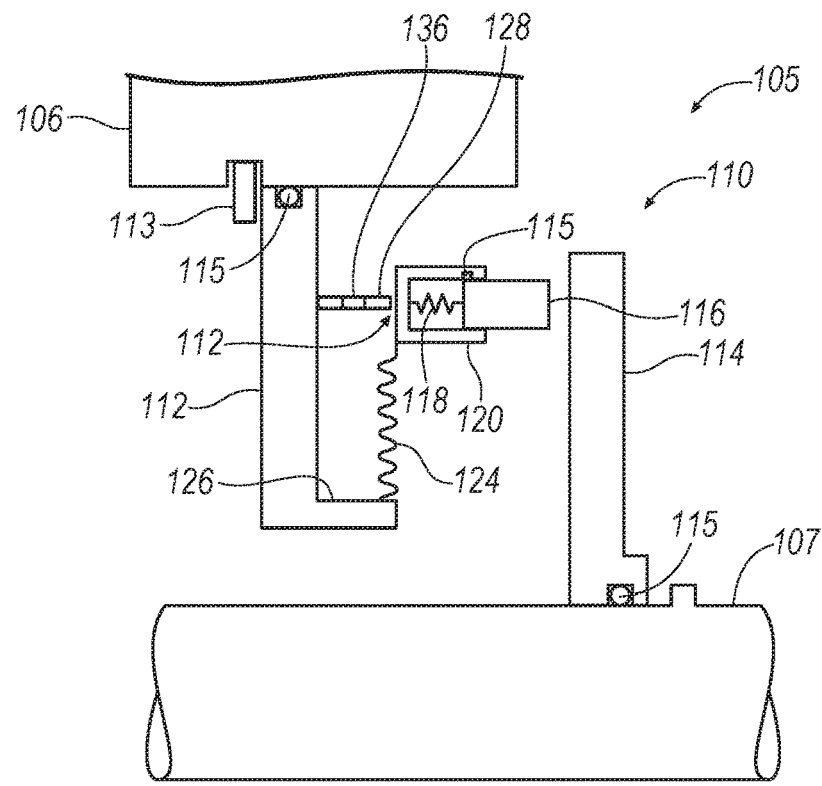
Figure 7:
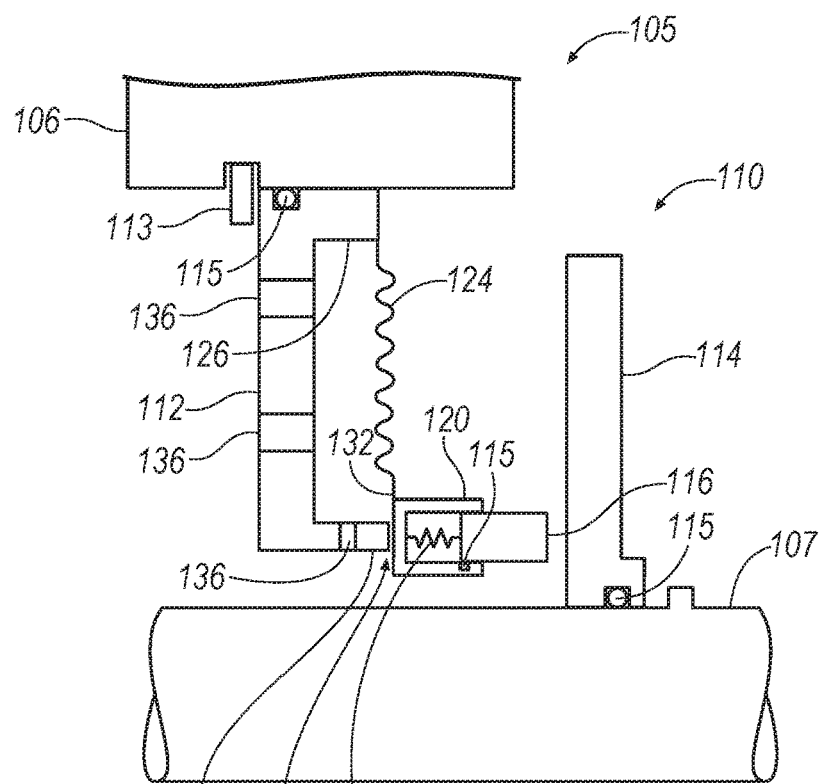

Referring now to FIGS. 6 and 7, the limit stop 128 may be unidirectional, positioned between the stator 112 and the casing 120. As with the limit stop 128 in FIGS. 2 and 3, the limit stop 128 may similarly have at least one vent hole 136 to allow the high pressure air to flow through it to the diaphragm 124. Where the internal pressure of the gearbox 105 is higher than the external pressure, the limit stop 128 may be positioned radially above the ledge 126, as seen in FIG. 6, such that there may be an air flow path for the high pressure air to flow to the diaphragm 124. Where the external pressure of the gearbox 105 is higher than the internal pressure, the limit stop 128 may be positioned at an unfixed end of the stator 112, as seen in FIG. 7, to similarly allow the high pressure air to flow to the diaphragm 124. As with the example depicted in FIG. 3, the stator 112 may also have vent holes 136 or other ventilation methods to further allow the high pressure air to flow to the diaphragm 124 to equalize the air pressure.

Figure 8:
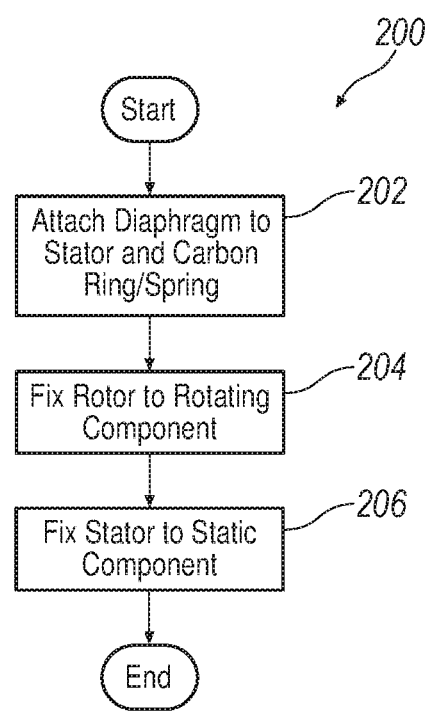
FIG. 8 illustrates an exemplary method for installing the carbon seal of FIGS. 2-7.

Referring now to FIG. 8, an exemplary method 200 for installing the carbon seal assembly 110, for example, in the gas turbine engine 101, is shown. Method 200 may begin at block 202 in which the diaphragm 124 may be attached to the stator 112 and to the carbon ring 116/spring 118 combination, for example by attaching the diaphragm 124 to the casing 120, to form a static assembly. The diaphragm 124 may be attached via gluing, welding, crimping, or any other process known to a person of ordinary skill in the art. At block 204, the rotor 114 may be fixed to a rotating component, such as the shaft 107, after which the rotor and rotating component (e.g., shaft 107) assembly may be installed, for example, in the gas turbine engine 101. At block 206, the stator assembly may be fixed to a static component, for example by fixing the stator 112 to a mechanical housing 106. The stator assembly and the rotor 114 may be fixed to the static component and the rotating component, respectively, via any processes known to a person of ordinary skill in the art, including, but not limited to, gluing, welding, crimping, spanner nuts, interference fits, friction fits including secondary seals, and the like.

The carbon ring 116/spring 118 combination generally may be positioned between the stator 112 and the rotor 114 such that the spring 118 may move the carbon ring 116 toward and away from the rotor 114, as described above. The carbon ring 116 and the rotor 114 may already be machined such that they are ready to mate at assembly, for example, flat and square to the axis of rotation. The static assembly may be installed or fixed before or after the rotor 114 and static component are installed, depending on whether the installation is a new build or is for service purposes, for example for a seal replacement without opening the mechanical housing to access the seal from inside.

Method 200 may further include providing a limit stop 128 attached to or extending from the stator 112 to ensure that the minimum spring load on the carbon ring 116 may be maintained. As described above, the positioning of the limit stop 128 may depend upon which of the external pressure of the gearbox 105 and the internal pressure is higher.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A carbon seal assembly comprising:
    a stator fixable to a static component;
    a rotor fixable to a rotating component rotatable relative to the static component;
    a carbon ring disposed between the stator and the rotor;
    a spring configured to move the carbon ring fore and aft between the stator and the rotor;
    a diaphragm operatively attached to the stator and to a combination of the spring and the carbon ring;
    a casing in which at least one of the spring and the carbon ring is at least partially disposed, wherein the diaphragm is attached to the casing; and
    a limit stop extending from the stator toward the rotor, the limit stop being configured to engage with the casing to limit movement of the carbon ring in a direction towards the stator and to allow high pressure air between the diaphragm and the stator;
    wherein the limit stop is unidirectional extending in a single direction and is positioned axially between the stator and the casing; and
    wherein the spring is disposed in the casing in a direction facing the rotor, and the limit stop is disposed on an opposite side of the casing facing the stator.

2. The carbon seal assembly of claim 1, wherein the static component is a mechanical housing and the rotating component is a shaft of a gas turbine engine.

3. The carbon seal assembly of claim 1, wherein the carbon seal assembly is an air riding carbon seal.

4. The carbon seal assembly of claim 1, wherein the carbon seal assembly is a contacting carbon face seal.

5. The carbon seal assembly of claim 1, wherein the limit stop extends from an intermediate portion of the stator.

6. The carbon seal assembly of claim 1, wherein the limit stop extends from a distal end of the stator.

7. The carbon seal assembly of claim 1, wherein the limit stop has at least one vent hole for equalizing air pressure.

8. A gas turbine engine, comprising:
    a mechanical housing;
    a shaft rotatable relative to the mechanical housing; and
    a carbon seal assembly having:
        a stator fixed to the mechanical housing;
        a rotor fixed to the shaft;
        a carbon ring disposed between the stator and the rotor;
        a spring configured to move the carbon ring fore and aft between the stator and the rotor;

a casing in which at least one of the spring and the carbon ring is at least partially disposed;

a diaphragm attached to the casing; and a limit stop extending from the stator toward the rotor, the limit stop being configured to engage with the casing to limit movement of the carbon ring in a direction towards the stator and to allow high pressure air between the diaphragm and the stator;

wherein the limit stop is unidirectional and is positioned axially between the stator and an axial end wall of the casing; and wherein the spring is disposed in the casing in a direction facing the rotor, and the limit stop is disposed on an opposite side of the casing facing the stator.

9. The gas turbine engine of claim 8, wherein the mechanical housing and the shaft are embodied in a gearbox.

10. The gas turbine engine of claim 8, wherein the carbon seal assembly is an air riding carbon seal.

11. The gas turbine engine of claim 8, wherein the carbon seal assembly is a contacting carbon face seal.

12. The gas turbine engine of claim 8, wherein the limit stop extends from an intermediate portion of the stator.

13. The gas turbine engine of claim 8, wherein the limit stop extends from a distal end of the stator.

14. The gas turbine engine of claim 8, wherein the limit stop is porous.

15. A method comprising:

attaching a diaphragm to a stator and a combination of a carbon ring and a spring to form a static assembly;

fixing a rotor to a rotating component rotatable relative to a static component;

fixing the static assembly to the static component; and positioning a unidirectional limit stop axially between the stator and an axial end wall of a casing in which the carbon ring and the spring are at least partially disposed such that the limit stop is configured to engage with the casing to limit movement of the carbon ring in a direction towards the stator and to allow high pressure air between the diaphragm and the stator, the limit stop extending in a single direction;

wherein the combination of the carbon ring and the spring is positioned between the stator and the rotor such that the carbon ring is movable toward and away from the rotor; and wherein the spring is disposed in the casing in a direction facing the rotor, and the limit stop is disposed on an opposite side of the casing facing the stator.

16. The method of claim 15, wherein the static component is a mechanical housing and the rotating component is a shaft of a gas turbine engine.

17. The method of claim 15, wherein the limit stop extends from an intermediate portion of the stator.

18. The method of claim 15, wherein the limit stop extends from a distal end of the stator.

19. The carbon seal assembly of claim 1, wherein the diaphragm has a bellows configuration.

20. The carbon seal assembly of claim 1, wherein the diaphragm extends in a radial direction.

* * * * *